United States Patent [19]
Dickson et al.

[11] Patent Number: 5,966,789
[45] Date of Patent: Oct. 19, 1999

[54] APPARATUS FOR ASSISTING IN THE INSERTION OF AN ELONGATE PLASTIC PIPE WITHIN AN EXISTING PIPE

[75] Inventors: Dudley Trevor Dickson, Seaton Delval; Colin Cochrane, Cramlington, both of United Kingdom

[73] Assignee: BG plc, Reading, United Kingdom

[21] Appl. No.: 08/828,179

[22] Filed: Mar. 18, 1997

Related U.S. Application Data

[62] Division of application No. 08/414,641, Apr. 3, 1995, Pat. No. 5,673,469.

[30] Foreign Application Priority Data

Jun. 8, 1994 [GB] United Kingdom .................... 9411467
Feb. 3, 1995 [GB] United Kingdom .................... 9502164

[51] Int. Cl.⁶ ...................................................... B23P 19/04
[52] U.S. Cl. ................................ 29/235; 29/241; 29/234; 254/134.3 FT
[58] Field of Search ........................... 29/402.09, 402.18, 29/460, 464, 890.036, 890.14, 890.141, 890.144, 239, 235, 241; 138/97, 98; 259/134.3 R, 134.3 FT

[56] References Cited

U.S. PATENT DOCUMENTS

| | | | |
|---|---|---|---|
| 4,321,740 | 3/1982 | Davis et al. ........................ | 29/402.09 |
| 4,410,391 | 10/1983 | Thomas et al. .................. | 29/402.09 X |
| 4,411,409 | 10/1983 | Smith .............................. | 254/134.3 FT |
| 4,582,551 | 4/1986 | Parkes et al. .................... | 29/402.18 X |
| 4,867,203 | 9/1989 | Putter ........................................ | 138/98 |
| 4,895,221 | 1/1990 | Carlson .......................... | 254/134.3 FT |
| 5,241,993 | 9/1993 | Stephens . | |
| 5,482,076 | 1/1996 | Taylor et al. .................... | 29/402.09 X |

FOREIGN PATENT DOCUMENTS

| | | |
|---|---|---|
| 2236158A | 3/1991 | United Kingdom . |
| 2249370A | 5/1992 | United Kingdom . |
| 2275981A | 9/1994 | United Kingdom . |

*Primary Examiner*—Robert C. Watson
*Attorney, Agent, or Firm*—Larson & Taylor

[57] ABSTRACT

A corrugated plastic service pipe 20 is inserted together with a flexible guide assembly 22 through an accessible end 11 of a steel service pipe 14, 10, which extends from the end 11 to a main 18. The flexible guide assembly 22 comprises a flexible guide element 24 and a flexible spring guide 26. The element 24 extends through a nose-piece 32 having an outer part secured to the pipe 20 and an inner part 36. The spring guide 26 carries a sensor 60 at its tip which emits a signal when the sensor enters the main 18. When the pipe 20 is correctly positioned fluid sealant 70 is injected into the space between the pipe 20 and the pipe 14, 10. When the sealant has solidified sufficiently, the guide assembly 22 is withdrawn through the pipe 20, the inner part 36 being separated from the outer part 34 to allow withdrawal of the spring guide 26.

7 Claims, 11 Drawing Sheets

APPARATUS FOR ASSISTING IN THE INSERTION OF AN ELONGATE PLASTIC PIPE WITHIN AN EXISTING PIPE

This is a division of application Ser. No. 08/414,641 filed Apr. 3, 1995, now U.S. Pat. No. 5,673,469.

BACKGROUND OF THE INVENTION

More particularly, the invention relates to installing a plastic service pipe in an existing steel service pipe. Typically, the service pipe is a gas service pipe but the invention is not limited to such an application but is applicable to water, fluid waste disposal or other service pipes, for example.

A method is known for replacing an existing steel service pipe extending from a main to a meter. The meter is removed and a plastic service pipe is inserted through the open end of the steel service pipe and advanced up to a point adjacent the main. The plastic pipe has a sealing head at its leading end. Fluid sealant is fed to the space between the plastic pipe and the steel service pipe. The sealing head sealingly engages the interior of the steel service pipe and has a seal. When the fluid sealant has solidified the seal is broken by the pointed end of a flexible rod inserted through the plastic pipe.

In such a known method the plastic service pipe has a cylindrical wall. The plastic service pipe has some flexibility allowing it to be inserted past a swept bend between the vertical and horizontal runs of the steel service pipe.

SUMMARY OF THE INVENTION

According to the invention, a method of installing a plastic service pipe in an existing steel service pipe which extends from a main to an accessible end, the method comprising inserting the plastic pipe through said accessible end, the plastic pipe being fed through the steel pipe and then injecting a fluid sealant into the space between the steel pipe and the plastic pipe is characterised by using a plastic pipe and by feeding an elongate flexible guide assembly into the steel pipe to aid in guiding the plastic pipe therein and subsequently withdrawing the flexible guide assembly, the plastic pipe either containing the guide assembly extending lengthwise thereof and the two being fed into the steel pipe together, or the guide assembly being fed into the steel pipe first and the plastic pipe being fed into the steel pipe second, the plastic pipe surrounding the guide assembly as it does so.

Apparatus for performing the method according to the invention comprises a flexible guide assembly the flexible assembly comprising a flexible guide element and a flexible spring guide and an annular nose-piece comprising an outer part which can be secured to the plastic pipe and an inner part mounted upon the flexible guide element.

An embodiment of a method of installing pipes will now be described by way of example with reference to the accompanying drawings:

DESCRIPTION OF THE PREFERRED EMBODIMENTS

Figure 1:
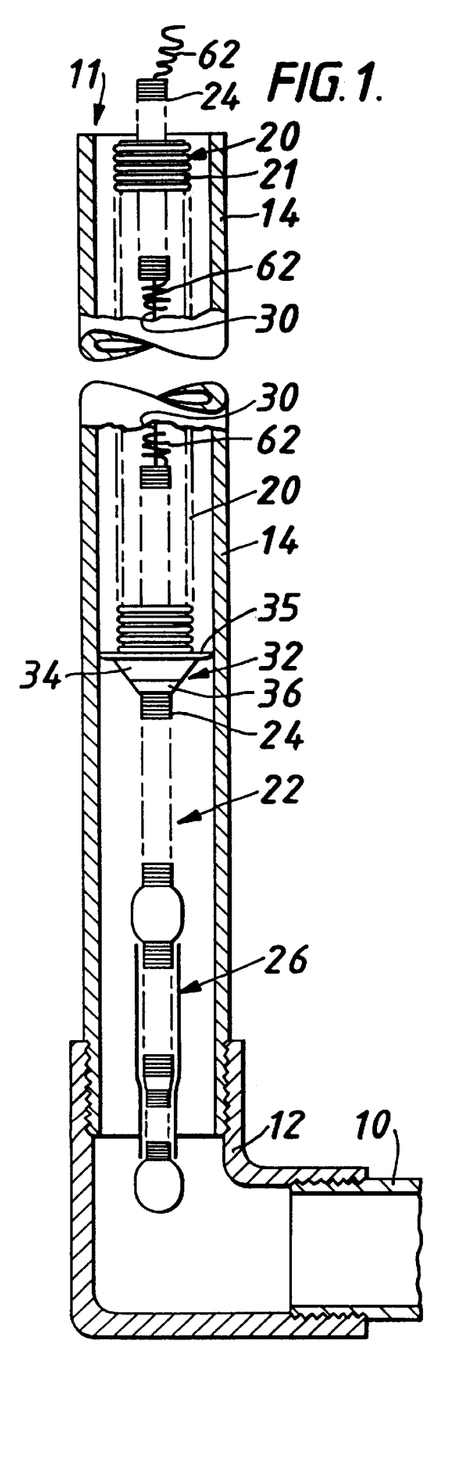
FIGS. 1 and 2 show vertical sections of the plastic service pipe negotiating a right-angled bend in a steel service pipe having a vertical leg and a horizontal leg.
Figures 3A, 4A:
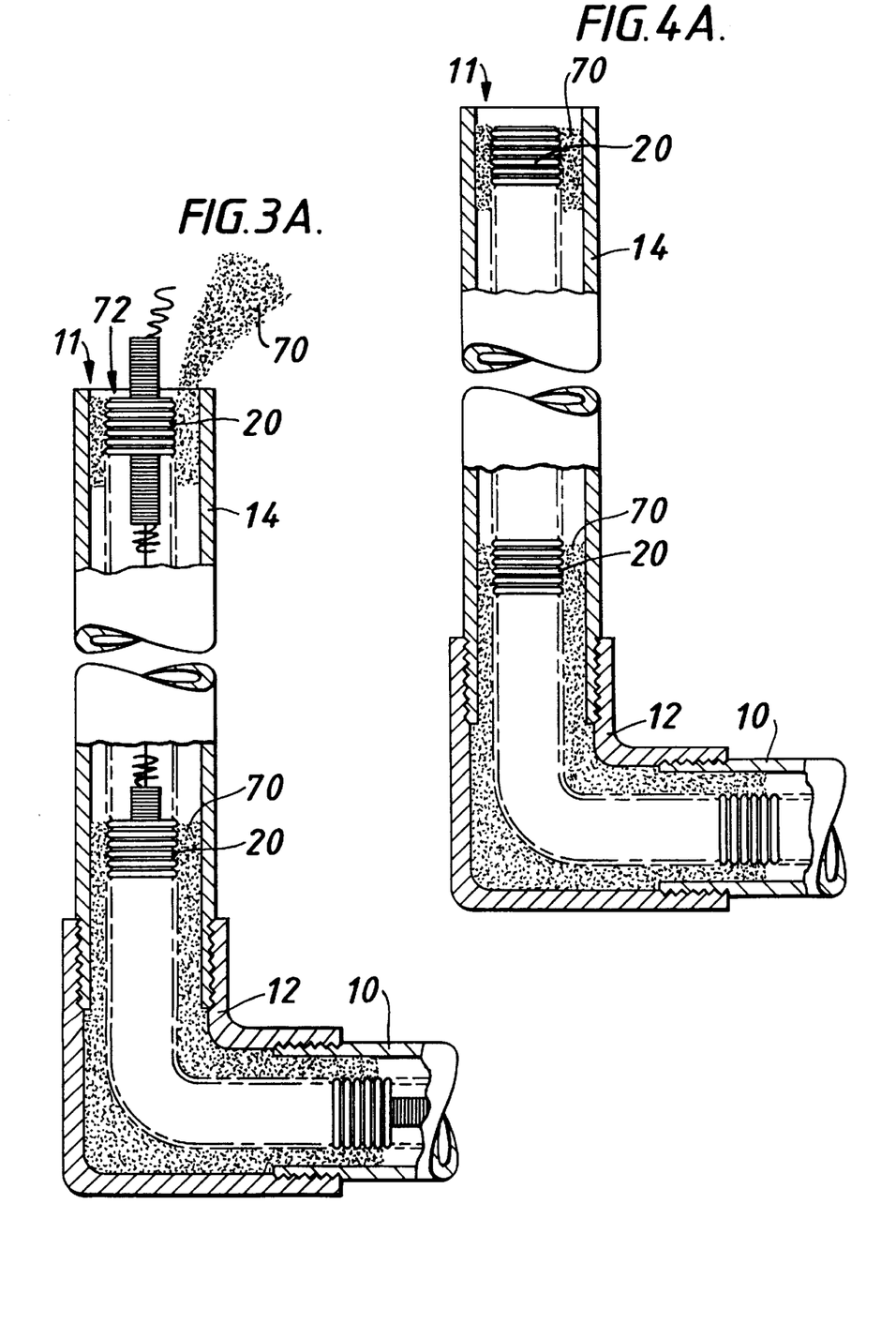
FIGS. 3A and 3B show a section similar to FIGS. 1 and 2 but also showing the gas main and the plastic pipe is now in its final position with grouting material in place between the plastic service pipe and the steel service pipe.
FIGS. 4A and 4B are similar to FIGS. 3A and 3B but show the position after the flexible guide assembly has been withdrawn.
Figure 3B:
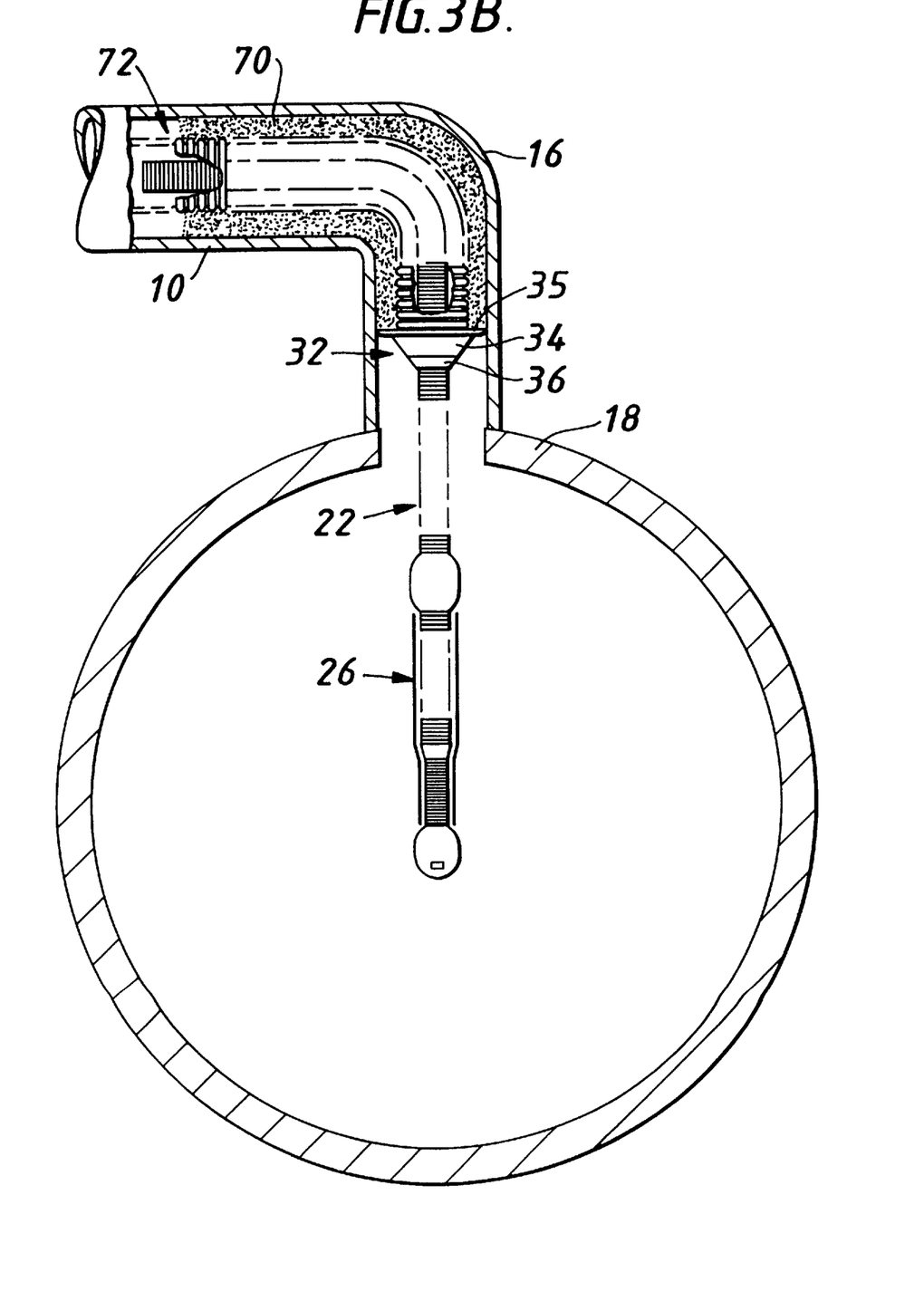
Figure 4B:
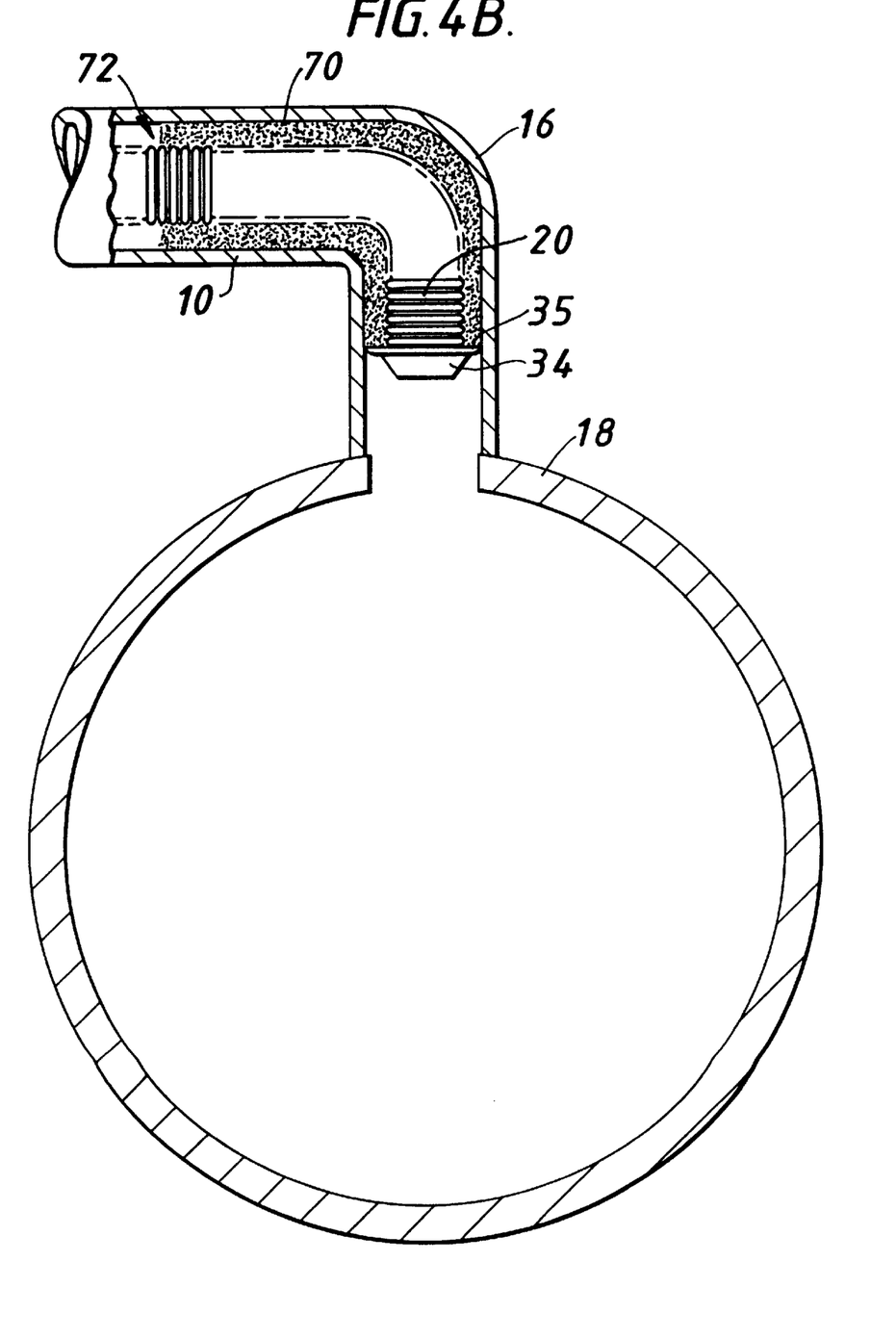

FIG. 1 shows a gas steel service pipe which extends from a gas main (FIG. 3B) to an accessible end (11) in a dwelling (not shown). The steel service pipe comprises a horizontal run 10, a right-angled fitting 12, and a vertical run 14. The view in FIG. 3B is taken from the opposite side of the steel service pipe and shows the horizontal run 10 having a 90° swept bend 16 which is connected to a gas main 18. The bend 16 would in another embodiment be replaced by a T-junction at which the horizontal run would join a short vertical run (joined to the main) at a right-angle.

The method is applicable to the installation of a plastic service pipe while the main 18 and the steel service pipe 10, 12 is "dead" i.e. devoid of gas or is "live" i.e. carrying gas.

The description given here assumes the main 18 and the steel service pipe 10, are "live".

Before beginning installation of the plastic service pipe, the meter is removed from the steel service pipe and gland means are substituted as described later, the procedure being such as to prevent the escape of gas. Whatever procedure is adopted, an accessible end 11 (FIGS. 1, 2, 3A, 4A) of the steel service pipe is in effect available at the upper end of the steel service pipe shown in FIG. 1.

The plastic service pipe 20 has a corrugated wall 21 and the peaks and troughs of the corrugations both extend circumferentially of the pipe so as to make the service pipe flexible. Nevertheless, the plastic service pipe, which is made of fire-retardant, high density polyethylene or gas grade polyethylene, is strong enough to withstand an internal pressure of at least 7 bar. The pipe 20, because of its corrugated wall, has sufficient flexibility to enable it to adopt an arcuate path, even in a 90° bend or elbow or a mitred elbow, without loss of its annular cross-section, as shown in FIGS. 3A, 3B or FIGS. 4A or 4B.

The plastic service pipe 20 is inserted through the accessible end of the steel service pipe 10, 14, together with a flexible guide assembly 22 which extends through the plastic pipe 20. The flexible guide assembly 22 comprises a flexible guide element 24 and a flexible spring guide 26.

The flexible guide element 24 comprises a coiled wire element with the turns of the coil touching when the element is unflexed. The element 24 has a wire cable 30 extending for the full length of the element through the inside of the turns of the element. This cable 30 prevents the element 24 from kinking when the element is deformed as the result of forces imposed on it, particularly compressive forces.

The flexible guide element 24 extends beyond the leading end of the plastic pipe 20. The leading end of the plastic pipe 20 has a nose-piece 32. The nose-piece comprises an outer annular part 34, having an outer flange 35 which is a close fit within the steel pipe 10, 14, and an inner annular part 36. The outer part 34 is secured to the plastic pipe 20 and the inner annular part 36 has a central aperture through which extends the flexible guide element 24.

Figure 5:
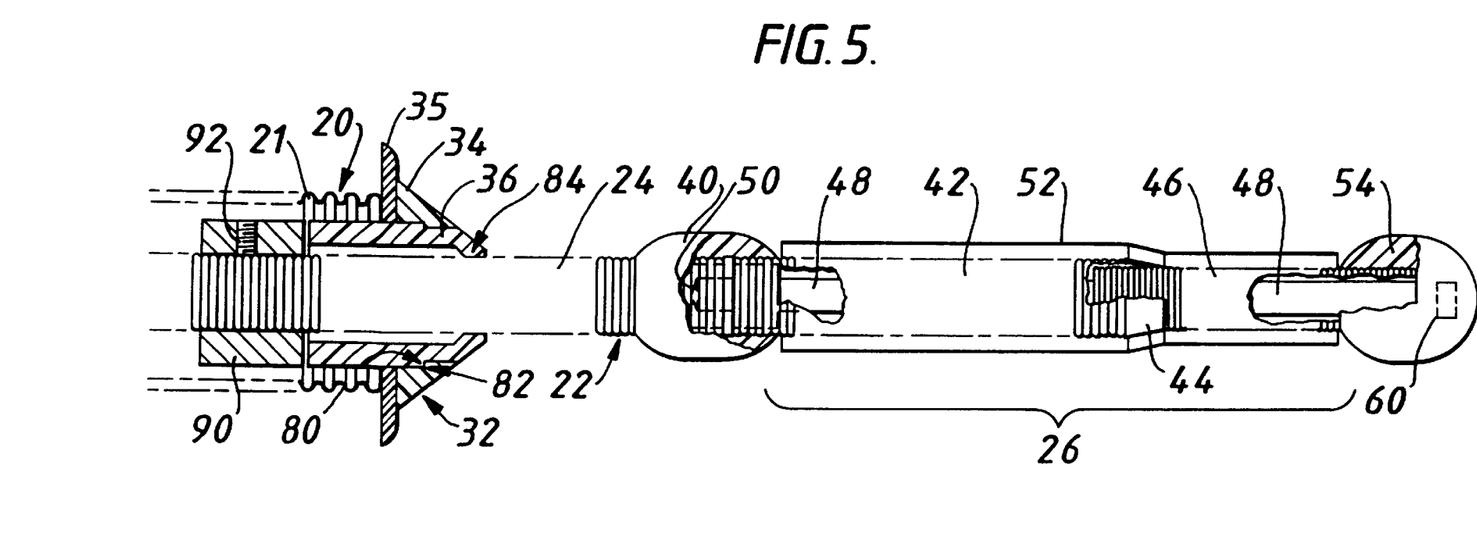
FIG. 5 is an enlarged longitudinal section of part of the flexible guide assembly shown in FIG. 1 and showing the flexible spring guide which forms part of the flexible guide element.

The construction of the nose-piece 32 is more clearly shown in FIG. 5. The inner annular part 36 has an external shoulder 80 which engages an internal shoulder 82 on the outer part 34. Thus, the internal part 36 cannot move downwardly, in the sense of FIG. 1, relative to the outer part 34. However, the part 36 can move upwardly, in the sense of FIG. 1, relative to the outer part 34 and can thus be displaced through the central aperture of the outer part 34 as explained below.

The inner part 36 (FIG. 5) has glands (not shown) at the surface 84 which engage the flexible guide element 24 in sliding and sealing relationship. The glands prevent gas from entering the tube 20.

The element 24 is joined to the flexible spring guide 26 by a bead 40 composed of poly-amide material. The flexible spring guide 26 comprises a spring 42 of coiled wire having its turns touching when unflexed; a further spring 46 of coiled wire having its turns touching when unflexed; a frusto-conical ferrule 44 at the leading end of the spring 42, which is secured to both the spring 42 and the spring 46; a length of rubber 48 which extends within the springs 42 and 46; and an adjusting screw 50 which is screwed into a tapped aperture in the bead 40. The screw 50 bears upon one end of the rubber length 48 and by turning the screw 50 the compressive load the rubber length 48 can be altered. This alters the pre-tension on the spring 46 and changes the sensitivity of the spring guide 26 to deflecting forces. The spring 46 is effectively made less stiff as the compression in the rubber 48 is increased.

The stiffness of the spring 42 is less than the stiffness of the flexible guide element 24. The stiffness of the spring 46 is less than the stiffness of the spring 42. It will be understood that this arrangement of springs enables the flexible guide assembly 22 to be inserted in the steel service pipe 10, 14, together with the plastic pipe 20, and enables the assembly to negotiate sharp 90° bends and elbows or mitred elbows.

FIG. 5 shows an annular abutment 90, which is secured to the flexible guide element 24 by a grub screw 92. By reciprocation of the guide element 24, blows can be delivered to the left-hand end of the inner part 36 of the nose cone 32 secured to the plastic service pipe 20. Such blows can be used when difficulty is encountered in persuading the plastic service pipe 20 to advance through the steel service pipe e.g. at the elbow 12.

Figure 2:
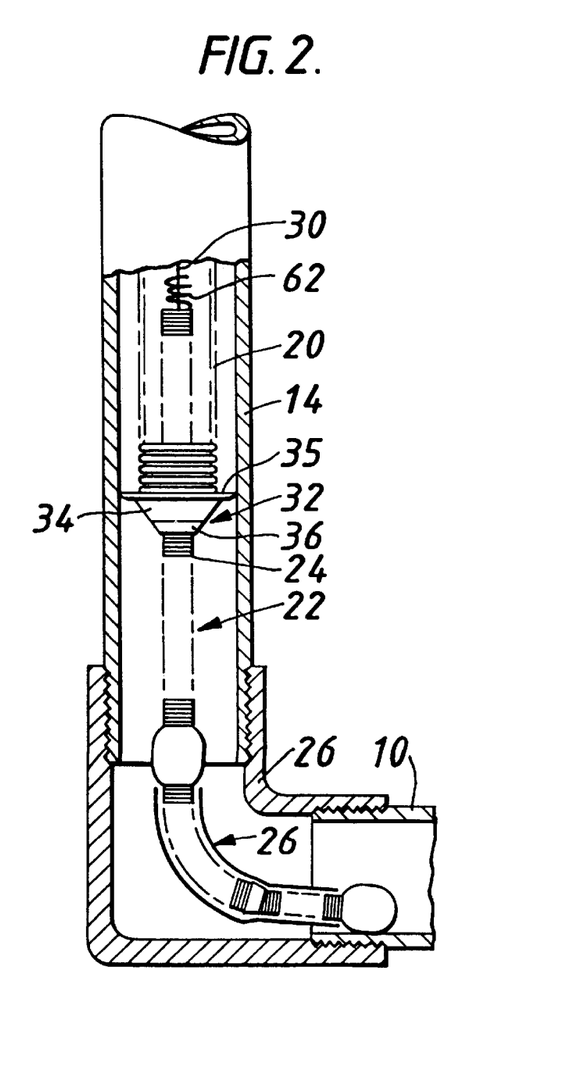

When the spring guide 26 is within a steel service pipe at an elbow, such as 12, the guide 26 circles the interior surface of the elbow 12 as the flexible assembly 22 is forced along the pipe 14. As soon as the spring guide 26 encounters an aperture in the interior surface of the elbow, for example the aperture of the horizontal limit of the elbow leading to the run 10 of the steel pipe, the spring 46 will enter that aperture. This is shown in FIG. 2. After the spring 46 has deflected into the run 10 of the steel pipe, the spring 42 readily follows, followed by the element 24. The presence of the flexible guide assembly 22 within the plastic pipe 20 guides the plastic pipe 20 around the elbow 12.

The spring guide 26 also comprises a braided plastic sheath 52, which prevents ingress of dirt into the interstices between the turns of the springs 42, 46.

The leading end of the spring 46 carries another bead 54 also made of poly-amide material.

The bead 54 contains a sensor element 60 which is connected by electrical leads 62 (FIG. 1) to an alarm (not shown) which is sounded when the sensor element 60 enters the main. The sensor element 60 emits a signal once it enters the main. The alarm is situated within the dwelling adjacent the position of the operative installing the plastic pipe 20. The position of the element 60 is optional and may be alternatively located in the rearmost bead 40 (see FIG. 9).

The plastic pipe 20 and the flexible guide assembly 22 are advanced along the steel service pipe 10, 14, until the plastic pipe 20 has reached the position, shown in FIG. 3B, within the vertical part of the bend of the steel pipe 10. The alarm emits a signal as soon as the sensor element 60 enters the main 18.

Once the plastic pipe 20 has been correctly positioned in the steel pipe 10, 14, a settable fluid sealant 70 is injected into the space 72 (FIG. 3) between the plastic pipe 20 and the steel service pipe 10, 14. Once the sealant 70 has sufficiently gelled, i.e. become solidified, the plastic pipe 20 is locked into the steel pipe and the flexible guide assembly 22 can be withdrawn through the plastic pipe 20 (FIG. 4).

The bead 40 engages the inner annular part 36 of the nose-piece 32 as the flexible guide assembly 22 is withdrawn. The bead 40 can separate the inner part 36 from the outer part 34, and the bead 40 can be withdrawn through the outer part 34 together with the spring guide 26.

In one form of carrying out the method, of particular use where the elbow 12 is replaced by a swept bend and where the 90° swept bend 16 is replaced by a larger radius swept bend, the flexible guide assembly 22 is inserted into the steel pipe 10, 14 first. This can check whether any obstructions are present in the pipe. Next, the plastic pipe 20 is inserted over the flexible guide assembly.

In another form of the method, the plastic pipe 20, together with the flexible guide assembly, is inserted into the steel service pipe 10, 14. This broadly is the form described above.

In yet another form of the method, the plastic pipe 20, together with the flexible guide assembly, is inserted into the steel service pipe 10, 14 but the nose-piece 32 is secured to the flexible guide element 24.

The flexible guide element 24 is graduated by marks indicating the length of the element. Once the sensor 60 has entered the main 18 a signal is emitted so that the position of the bead 54, and also the position of the bead 40, is known to the operative. The position of the nose-piece 32 is also known by comparison of the length of the element 24 with the inserted length of the tube 20. Thus, the position of the nose-piece 32 is known and the nose-piece 32 can be precisely located in the service pipe 10 in the vertical part immediately above the main 18.

Figure 6:
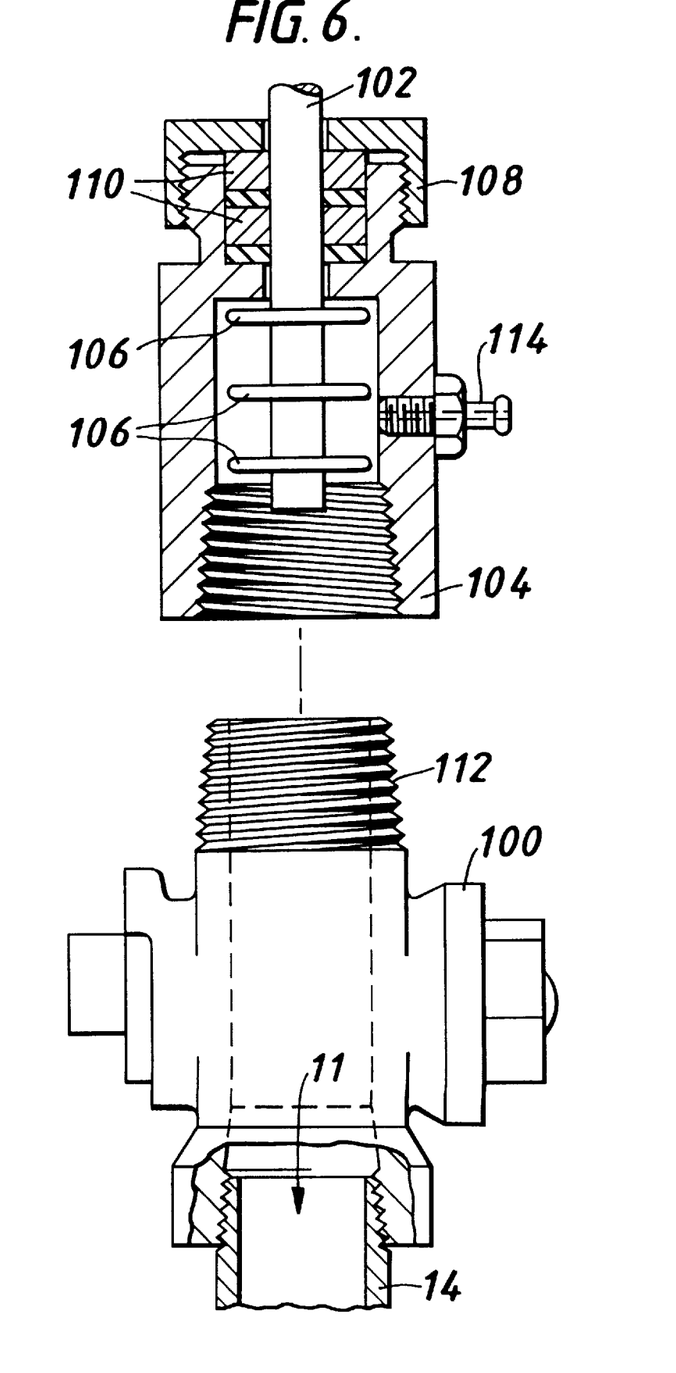
FIGS. 6, 7 and 8 show the various components used to enable a meter to be removed from the end of the steel service pipe and the plastic pipe and flexible assembly to be inserted through the accessible end of the steel service pipe.
Figure 7:
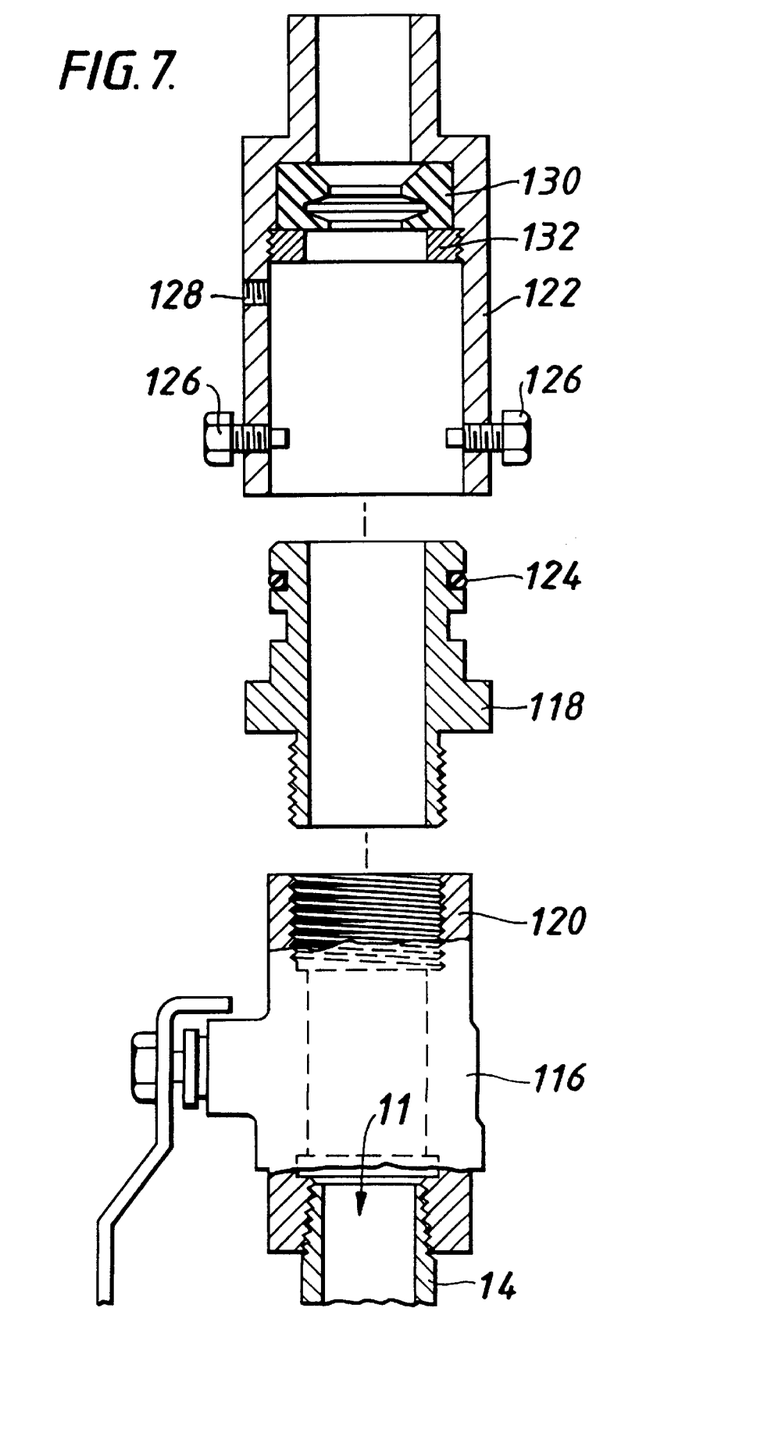

FIGS. 6 and 7 show how the accessible end 11 of the steel service pipe 14 is exposed in practice.

FIG. 6 shows a meter cock 100 connected to the top of the steel service pipe 14. The meter cock 100 is normally connected by a flexible steel pipe to a governor which is connected to a gas meter (not shown). The first step is to close the meter cock 100 and disconnect the flexible steel pipe from the meter cock 100.

Next, a stopper 102, is inserted in a stopper loader 104 so that the rubber sealing discs 106 are positioned in the stopper loader 104 as shown and the nut 108 is tightened so as to compress the gland seal 110 onto the stopper 102. The gland seal 110 is made up of rubber and metal discs.

Next, the stopper loader 104 is screwed onto the end 112 of the meter cock 100.

The cock is opened and the stopper 102 is pushed into the loader 104 and through the meter cock 100 until the discs 106 occupy the steel service pipe 14 immediately below the meter cock 100. A check is made at the checkpoint 114.

The loader 104 and the cock 100 are removed by unscrewing the meter cock 100 from the screwed upper end of the steel service pipe 14.

Next, a ball valve 116 (FIG. 7) is screwed onto the screwed upper end of the steel service pipe 14, the ball valve 116 being in the open condition.

Next, an adaptor 118 is screwed into the screwed socket 120 of the ball valve and a holding chamber 122 is connected over the upper end of the adaptor 118. A seal 124 on the adaptor 118 engages the inside of the holding chamber 122, which is held in place by three screws 126 on the holding chamber 122.

The holding chamber 122 has a screwed through hole 128 at which a leakage check can be made. Also the chamber 122 contains an annular seal 130 locked in place by a screwed lock ring 132. Finally, the holding chamber 122 has a spigot extension 134 at its upper end through which the plastic service pipe 20 can be inserted.

It will be appreciated that the ball valve 116, the adaptor 118 and the holding chamber 122 are each fitted over the stopper 102 which extends through each of them.

The next stage is to withdraw the stopper 102 partially to a position in which the discs 106 occupy the holding chamber 122. The ball valve 116 can now be closed.

The screws 126 are now unscrewed and the holding chamber 122 is now removed from the adaptor 118, together with the stopper 102.

The holding chamber 122 is replaced on the adaptor 118 and the nose piece 32 secured to the leading end of the plastic service pipe 20, with the flexible guide assembly 22 as shown in FIG. 1, is inserted through the seal 130. The flange 35 on the nose piece 32 sealingly engages the interior of the adaptor 118 initially. The ball valve 116 is opened and the plastic service pipe 20, together with the flexible guide assembly 22, is inserted through the ball valve 116 and through the accessible end 11 of the steel service pipe 14.

When the plastic service pipe 20 has been fully inserted the service is pressure tested.

Next, the ball valve 116, together with the adaptor 118 and holding chamber 122 are removed from the steel service pipe 14. The plastic pipe 20 is cut off to the correct length a sufficient distance beyond the accessible end 11 (see FIG. 8).

A service head adaptor 140 (FIG. 8) is now screwed onto the steel service pipe 14. The service pipe is again pressure tested.

Figure 8:
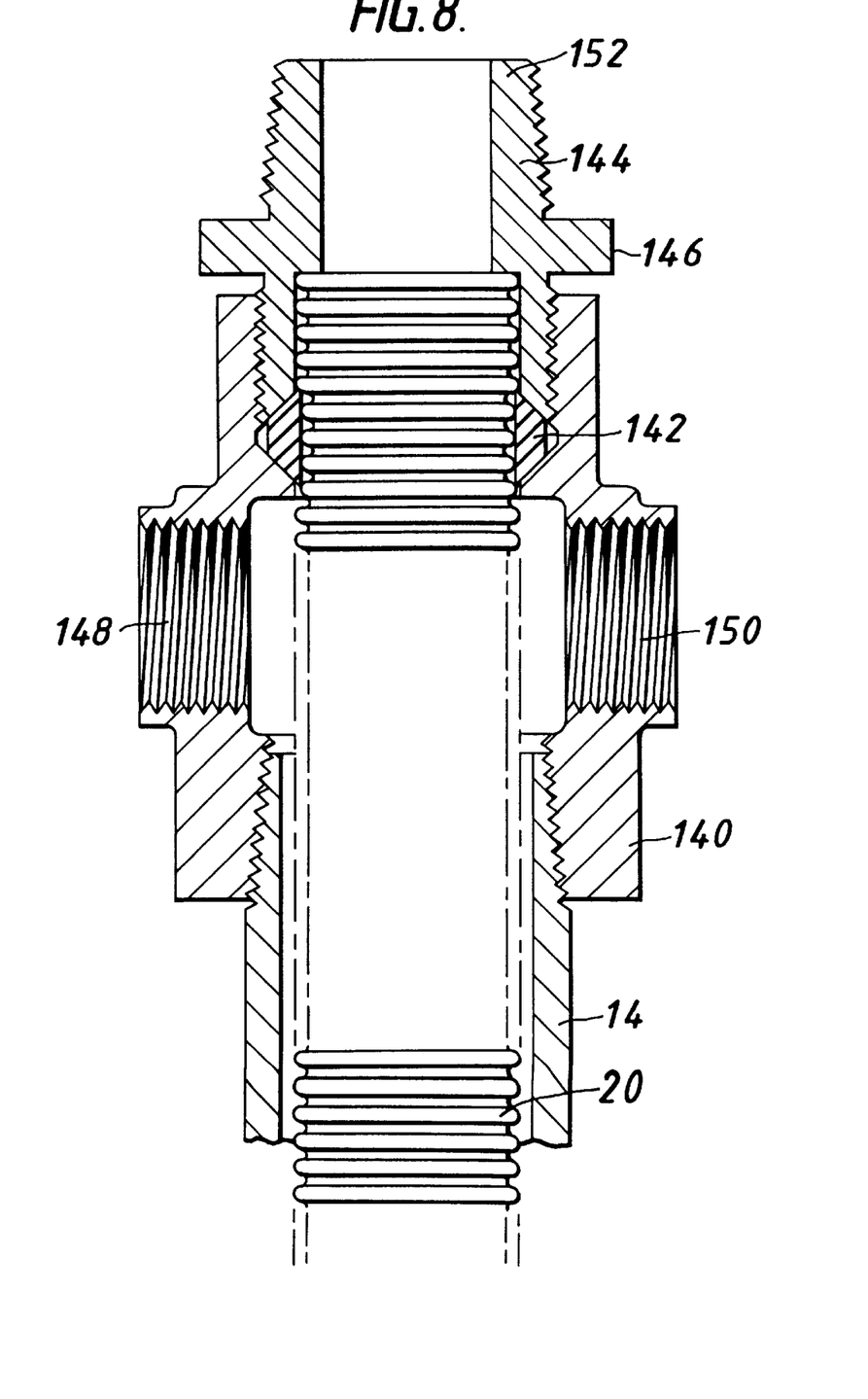

The upper end of the service head adaptor 140 carries an internal annular compression seal 142 which is compressed onto the plastic pipe 20 by a connector 144 having an external hexagonal nut formation 146. Fluid sealant is injected into the space 72 between the steel service pipe 14 and the plastic pipe 20 through the port 148 in the service head adaptor 140, while port 150 allows air displacement from the space 72.

When the space 72 is full of sealant, the meter cock 100 is screwed onto the screwed spigot 152 of the connector 144 and the stopper loader 104 is screwed onto the end 112 of the meter cock 100. The meter cock 100 is of course in the open condition. The flexible guide element 24 is fed through the gland assembly 110 and the nut 108 is tightened upon the gland assembly 110.

When the sealant has solidified sufficiently, the flexible assembly 22 is withdrawn. When the bead 40 meets the inner part 36 the latter is displaced and it moves with the bead 40, allowing recovery of the spring guide 26. The flexible guide assembly 22 is withdrawn until the spring guide 26 occupies the loader 104. The meter cock 100 can then be closed.

The loader 104 can then be unscrewed from the upper end 112 of the meter cock 100 and the end 112 is either capped or connected to a meter.

Figure 9:
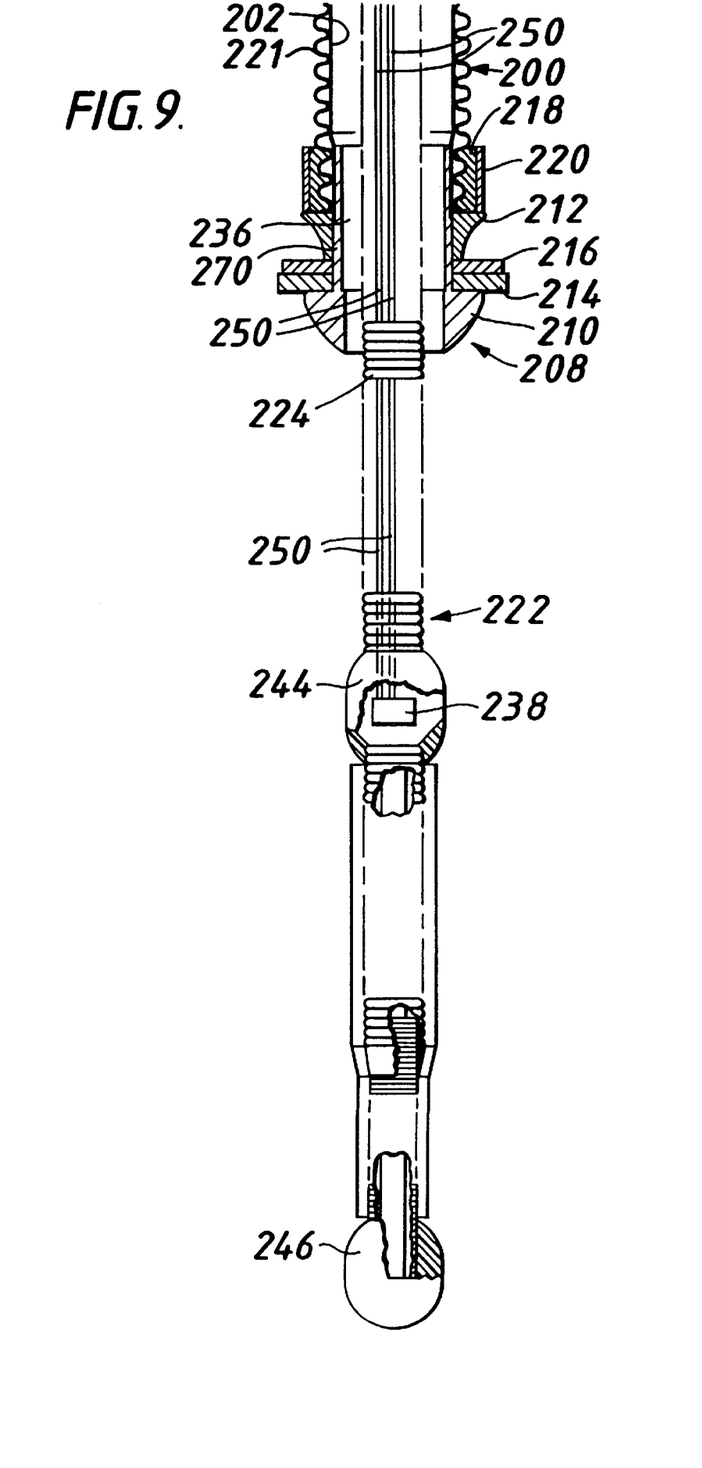
FIGS. 9, 10 and 11 show a further embodiment in which the corrugated plastic service pipe includes an inner liner.
Figure 10:
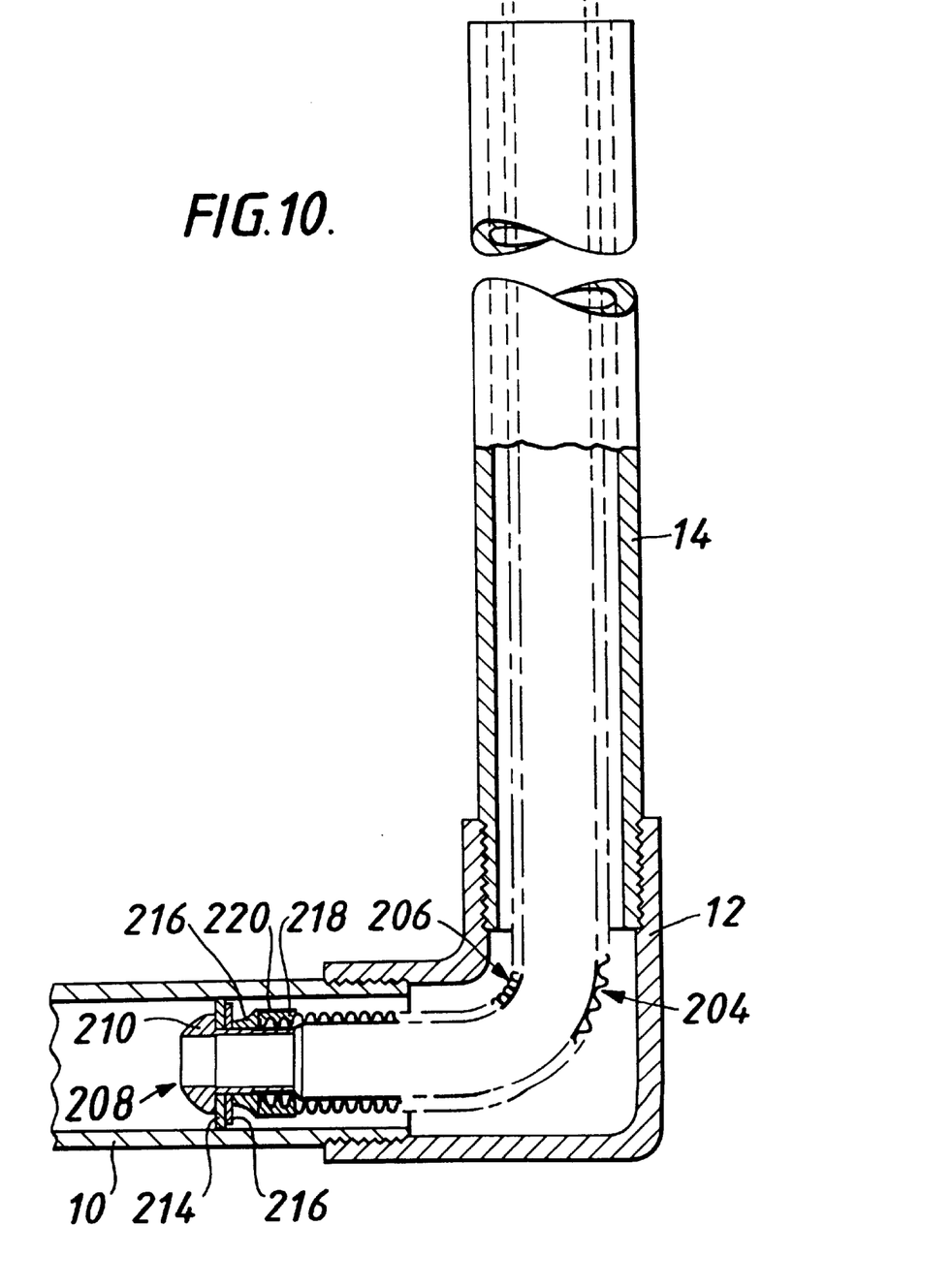

FIGS. 9 & 10 show a further embodiment in which the corrugated plastic service pipe 200 includes an inner liner 202. The liner 202 in this embodiment is made of the same material as the outer corrugated pipe but in alternative embodiments the liner can be made of a material different from that of the plastic pipe 200. For example, both the corrugated pipe and its liner are made from gas grade polyethylene. The liner 202 is elastic and can stretch in order to accommodate extension of the corrugated pipe 200, as shown at 204 in FIG. 10, where the corrugated pipe negotiates an elbow, the extension occurring at the outside of the elbow. On the inside of the elbow the corrugated pipe undergoes contraction at 206 and the liner 202 also contracts and becomes slightly buckled. In FIG. 10 the flexible guide assembly has been omitted for the sake of simplicity.

It will be understood that in this embodiment the liner 202 is attached to successive corrugations of the outer pipe 200. However, this is not an essential feature of the invention.

In an alternative form of construction, the liner is formed by filling the internal grooves of the corrugations of the plastic pipe 200 with an elastomeric filler material. A mandrel is passed through the plastic pipe 200 to finish the filling and to leave a smooth internal passage within the pipe 200. In yet another form of construction, the internal grooves of the corrugations are filled with a cellular rubber or other elastomeric material which will stretch.

The liner or other means contained by the plastic pipe 200 provides a smooth internal passage in order to lessen the pressure drop which the gas or other fluid flowing through the pipe 200 experiences in flowing through a corrugated pipe.

So long as the liner or other means provides that smooth internal passage, it is immaterial that the liner or other means is everywhere continuous. The liner or other means may be made with slits or other apertures or may break during installation. Even if gas passes through such apertures, the plastic pipe 200 remains as a gas-proof barrier.

The embodiment shown in FIGS. 9 & 10 is particularly suitable for use in gas supply systems which operate at relatively low gas pressures of up to, say, 75 millibars. At low pressures such as these, gas flow through the corrugated pipe shown in FIGS. 1 to 8 undergoes an excessive pressure drop owing to the corrugations, which cause non-linear flow. The use of a corrugated pipe 200 including a liner 202 allows the gas to flow through a smooth internal passage with greatly reduced non-linear flow and so the pressure drop is reduced to a level which can be tolerated.

The lower end of the pipe 200 (FIG. 9) is connected to a nose-piece 208.

The nose-piece 208 has an integral forward external flange 210 and a rearward external flange 216 formed by a nut screwed onto the body of the nose-piece 208. Between these flanges 210 and 212 there are trapped two annular seals. The forward seal 214 is composed of cellular rubber while the rearward seal 216 is composed of neoprene rubber.

The pipe 200 is connected to the rear of the nose-piece 208 by a rubber body 218, which is held in place by an outer band 220 of polyethylene.

FIG. 9 also shows the leading end of the flexible guide assembly 222 which corresponds to the guide assembly 22 shown in FIG. 1. In this embodiment the guide assembly 222 is in two parts which are joined end to end within the inner part 236 (corresponding to the inner part 36 shown in FIG. 5). The rearward part of the guide assembly 222 is omitted from FIG. 9 but extends rearwardly from the inner part 236 through the pipe 200. The inner part 236 is also in two parts (not shown). Each part incorporates an electrical plug (not shown) to enable the leading end of the flexible guide assembly 222 to be readily replaced should it become damaged. Of course, once the two plugs have been connected the inner part 236 of the nose-piece 208 behaves exactly as a unitary assembly during the installation of the pipe 200.

Figure 11:
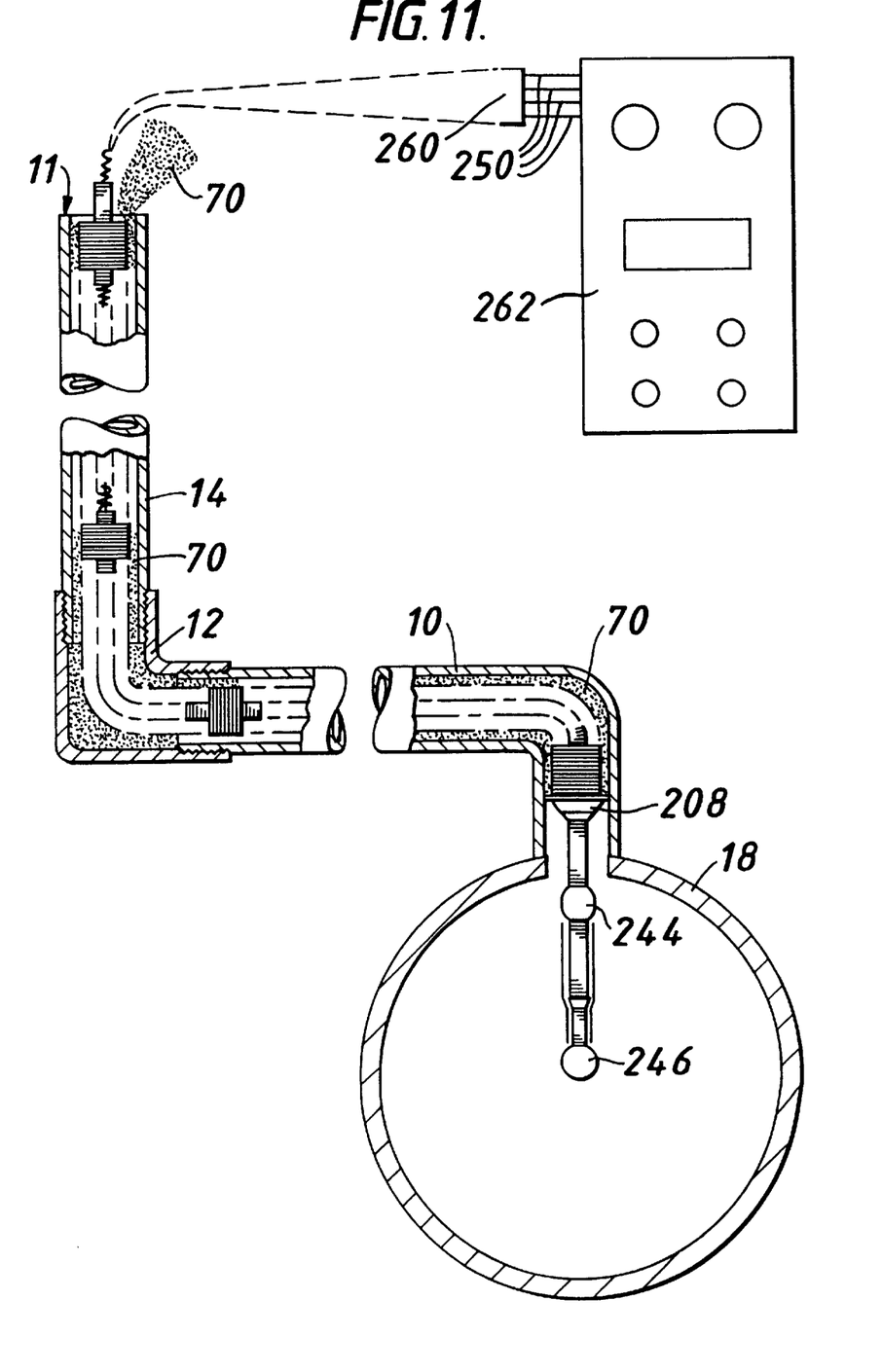

The leading end of the guide assembly 222 shown in FIG. 9 incorporates a sensor element 238 connected by wires 250 to a combined power supply and signal processor 262 (FIG. 11). The sensor element 238 is housed in the rearward one 244 of two beads 244, 246 corresponding to the beads 40 and 54 shown in FIG. 5. The wires 250 pass within the flexible coiled wire guide element 224 to the plug (not shown) within the inner part 236.

That plug is connected to a second plug (not shown) within the inner part 236 and from the second plug the wires continue within the flexible coiled wire guide element (not shown) within the pipe 200. For simplicity, the wires 250 are shown passing continuously through the inner part 236 of the nose-piece 208.

FIG. 11 shows the wires 250 which are combined in a cable 260 and connected to the power supply and signal processor 262.

While the bead 244 is within the steel service pipe 10,14 no alarm signal is emitted by the loudspeaker connected to the processor 262. When the bead 244 enters the main 18 the alarm is sounded (as before) and the position of the nose-piece 208 (which had been advanced within the steel pipe 10, 14 at the same time as the flexible guide assembly 222) is known to be within the T-shaped connection next adjacent to the main 18.

With the corrugated pipe 200 correctly positioned, the fluid sealant 70 can be injected at the open end 11 of the steel pipe 10, 14 to fill-the space between the steel pipe 10,14 and the plastic corrugated pipe 200, as previously described with reference to FIGS. 1 to 8.

Once the sealant 70 has set solid, the flexible guide assembly 222 is withdrawn from the pipe 200. The inner part 236 of the nose-piece 208 separates from the outer part 270 and moves upwardly (FIG. 9) relative to the outer part 270.

The beads 244 and 246 pass upwardly through the aperture in the outer part 270 previously occupied by the inner part 236.

We claim:

1. Apparatus for assisting in the insertion of an elongate plastic pipe within an existing pipe, said apparatus comprising a flexible guide assembly, said flexible guide assembly comprising an elongate flexible guide element, an elongate flexible spring guide secured to and extending beyond a leading end of said flexible guide element, and an annular nose-piece, said annular nose-piece comprising an outer part to which, in use of the apparatus, a leading end of an elongate plastic pipe can be secured, and an inner part mounted upon the flexible guide element, said flexible guide assembly being sufficiently flexible to allow passage thereof past a swept bend of 90° in the existing pipe, and wherein the inner part of the nose-piece is configured so that, in use of the apparatus, after insertion of the flexible guide assembly and an elongate plastic pipe within an existing pipe, the inner part of the nose-piece becomes separated from said outer part of the nose-piece and withdrawn from within the plastic pipe together with the flexible guide element upon withdrawal of the flexible guide element and flexible spring guide from within the elongate plastic pipe.

2. Apparatus as claimed in claim 1 wherein the nose-piece is configured such that, in use of the apparatus, the nose piece can be pushed within an existing pipe to allow the elongate plastic pipe to travel with the flexible guide assembly through the existing pipe.

3. Apparatus as claimed in claim 1 or 2 wherein the nose-piece includes an outer flange for effecting, in use of the apparatus, a close fit within an existing pipe.

4. Apparatus as claimed in claim 3 wherein the outer flange is configured to act, when inserted within an existing pipe, as a barrier for sealant introduced into the existing pipe.

5. Apparatus as claimed in claim 1 wherein the guide element includes a guide bead at its leading end.

6. Apparatus as claimed in claim 5 wherein the bead includes a sensor element.

7. Apparatus as claimed in claim 1 wherein the flexible spring guide comprises a length of rubber extending within the flexible spring guide, a spring surrounding said length of rubber and forming a leading end of said flexible spring guide, and means for increasing the compressive load in the length of rubber and so increase the pre-tension in the spring surrounding the length of rubber so that the apparent stiffness of the spring is reduced.

* * * * *